UNITED STATES PATENT OFFICE.

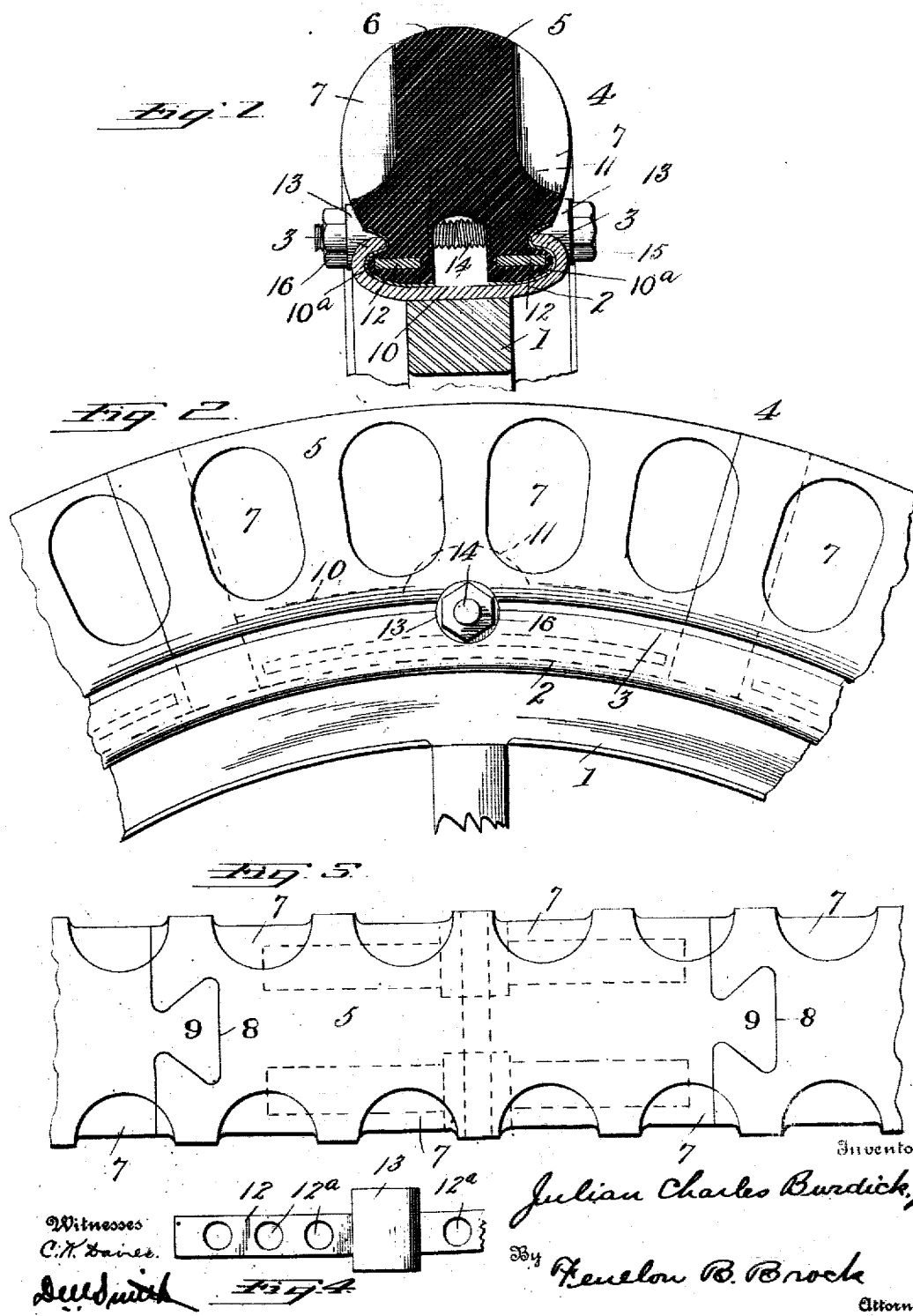

JULIAN CHARLES BURDICK, JR., OF FLUSHING, NEW YORK.

CUSHION-TIRE.

No. 824,778.　　　Specification of Letters Patent.　　　Patented July 3, 1906.

Application filed August 24, 1905. Serial No. 275,694.

*To all whom it may concern:*

Be it known that I, JULIAN CHARLES BURDICK, Jr., a citizen of the United States, and a resident of Flushing, county of Queens, and State of New York, have invented a new and useful Cushion-Tire, of which the following is a specification.

A principal object of my invention is the provision of an elastic tire having great resiliency and durability and increased adhesion under certain conditions for purposes of traction and the prevention of skidding.

Other objects are to provide a tire of sectional construction for the sake of economy and ease of replacement or repair of damaged parts, to enable it to be readily adapted to various styles of rims or fellies and modes of attachment, and to provide suitable improved means of attaching the same to the rim.

The advantages of my invention are more fully set forth hereinafter with reference to the accompanying drawings of an exemplifying structure in which the said invention is embodied, and in which—

Figure 1 is a cross-sectional view of such a structure. Fig. 2 is a side elevation of a portion of a wheel felly, rim, and tire. Fig. 3 is a plan view of a portion of a tire, showing portions of two tire-sections and my interlocking connection therefor; and Fig. 4, a detail view of a locking-strip.

In the drawings reference-numeral 1 designates a felly; 2, a rim thereon, in this instance of metal, clencher shape, to which my tire may be readily adapted, but which may be replaced by many other forms of rims or omitted altogether, in which case the tire would be attached directly to the felly; 3, the inwardly-turned clencher edges of the rim; 4, the tire considered as a whole, usually of rubber or a rubber composition; 5, the separable sections of the same; 6, the tread, of any desired sectional shape, but preferably rounded, as in Fig. 1; 7, hollowed portions or recesses formed in the sides of the tire, preferably extending approximately to the rim or felly and intersecting the tread at a point somewhat removed from its normal greatest circumference and preferably also placed oppositely on the two sides of the tire, although the form and arrangement of these recesses are not material; 8, grooves, one provided in one end of each tire-section; 9, tongues, one on the end of each section opposite to its grooved end and adapted to enter the groove in the adjoining section, the tongues 9 and grooves 8 constituting interlocking connections for securing the tire-sections to each other; 10, a central longitudinal cleft or slot formed in the base of each section, leaving the base bifurcated, each part of the base being provided with an outwardly-presenting hooked member 10$^a$ to engage the corresponding hook in the rim; 11, an enlargement which may be placed centrally in each slot 10 to accommodate the locking-bolts, but is not indispensable; 12, metal strips, having perforations 12$^a$, embedded in the tire-sections, one near the inner surface of each part of the bifurcated base; 13, bolt-lugs, one on each strip 12, the two lugs of each section being placed oppositely and each lug preferably extending outwardly slightly from the walls of the tire, as shown, and being accommodated in the rim by properly forming or cutting recesses for the purpose in the clencher edges 3 of the rim; 14, locking-bolts, one for each tire-section, having right and left threads engaging corresponding threads in the two lugs 13 of each section, so that by turning the bolt in one direction the lugs, and hence the strips 12 and portions of the tire-base, are drawn together, and by opposite movement of the bolt said parts are forced apart; 15, nut-shaped bolt-heads for turning bolts 14; 16, lock-nuts on the opposite ends of the bolts for locking the same when properly positioned.

Supposing the tire to be disassembled, each section is put in place in the rim by turning its bolt 14 (by means of its nut 15) so as to draw the base portions of the section together sufficiently to enter the rim and placing the section in the rim, at the same time inserting its tongue 9 in the groove 8 of the adjacent tire-section, or vice versa. By then turning the bolt in the opposite direction the hooked members of the section are brought snugly into engagement with the clencher member of the rim and further secured against displacement by setting up the lock-nut 16.

Many merits of the present invention are apparent to those skilled in the art without further description, but some of them will be particularly pointed out. The recesses in the tire permit an expansion of the rubber when under compression longitudinally to a great extent as well as laterally, and also on slippery road-surfaces and in snow and slush serve to increase traction and prevent side-slipping. The tire is readily and quickly assembled. Serious damage to one section only necessitates its removal and replacement by a spare part and does not retire the tire from service during repairs.

While all the parts of the invention described coöperate to great advantage in a complete tire structure, yet some of them—as, for instance, the attachment device and the sectional and recessed structure of the tire proper—possess important novel features apart from the others, and I contemplate the use of all such novel features of this invention in any cases where they may be advantageously employed, either separately or in combination with one or more of the other of said features.

What I claim is—

1. A wheel-tire comprising a plurality of sections having interlocking abutting faces so shaped as to resist relative longitudinal movement of the sections.

2. A wheel-tire comprising a plurality of sections having interlocking abutting faces so shaped as to prevent relative longitudinal movement of the sections extending radially from the rim to the tread, and each section having a plurality of recesses formed in its sides, intersecting the tread.

3. In a wheel, the combination of a rim having hooked edges, and a tire composed of a plurality of sections, each being formed with a longitudinal basal recess and having a hook on each base portion formed thereby for engaging the corresponding rim-hook, a metal strip in each base portion bearing a lug, and a right and left threaded bolt engaging said lugs.

4. In a wheel, the combination of a rim having hooked edges, and a tire composed of a plurality of sections, each being formed with a longitudinal basal recess and having a hook on each base portion formed thereby for engaging the corresponding rim-hook, a metal strip in each base portion bearing a lug, a right and left threaded bolt engaging said lugs, means for turning said bolt, and a lock-nut thereon.

5. A tire adapted to a clencher-rim, comprising a number of sections, each having radially-extending interlocking members so formed as to prevent relative longitudinal movement of the sections, a bifurcated base, a clencher member on each base portion, and mechanical means for forcing said clencher members into engagement with the clencher-rim.

6. In a tire, a plurality of sections having a tread of rounded cross-section, and recesses formed opposite each other in opposite sides of each section and intersecting the tread.

7. A tire, comprising a plurality of sections of flexible or compressible material, each having a double base portion, a longitudinal metallic strip in each base portion provided with an internal screw-threaded part, a bolt with right and left hand threads engaging the screw-threaded parts of said strips, and longitudinal hooks formed on the outer side of each base portion, adapted to engage coöperating rim-hooks.

8. In a tire, a plurality of sections having a tread of rounded cross-section, recesses formed opposite each other in opposite sides of each section and intersecting the tread, and a fastening device comprising a double-threaded bolt engaging metallic members carried in the base of each section, for locking the same to a coöperating clencher-rim.

In testimony whereof I have affixed my name hereunto in the presence of two subscribing witnesses.

JULIAN CHARLES BURDICK, JR.

Witnesses:
OSCAR NYGREN,
CARL F. HESSE, JR.